United States Patent
Kumada et al.

(10) Patent No.: US 8,131,457 B2
(45) Date of Patent: Mar. 6, 2012

(54) NAVIGATION TERMINAL DEVICE AND NAVIGATION METHOD

(75) Inventors: Satoshi Kumada, Meguro (JP); Toshie Shirahama, Meguro (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 0 days.

(21) Appl. No.: 11/957,588

(22) Filed: Dec. 17, 2007

(65) Prior Publication Data

US 2008/0109155 A1    May 8, 2008

Related U.S. Application Data

(62) Division of application No. 10/127,502, filed on Apr. 23, 2002, now abandoned.

(30) Foreign Application Priority Data

Apr. 27, 2001    (JP) .................................. 2001-133362

(51) Int. Cl.
G06F 17/30    (2006.01)
(52) U.S. Cl. ......... 701/200; 345/684; 345/157; 345/123
(58) Field of Classification Search .................. 701/200; 345/661, 684, 157, 123
See application file for complete search history.

(56) References Cited

U.S. PATENT DOCUMENTS

| | | | |
|---|---|---|---|
| 4,677,561 A | 6/1987 | Akama et al. | |
| 5,612,881 A | 3/1997 | Moroto et al. | |
| 5,652,706 A | 7/1997 | Morimoto et al. | |
| 5,745,866 A * | 4/1998 | Steiner | 701/200 |
| 5,774,362 A | 6/1998 | Suzuki et al. | |
| 5,821,880 A | 10/1998 | Morimoto et al. | |
| 5,825,349 A * | 10/1998 | Meier et al. | 345/684 |
| 6,121,900 A | 9/2000 | Takishita | |
| 6,147,670 A * | 11/2000 | Rossmann | 345/685 |
| 6,148,253 A | 11/2000 | Taguchi et al. | |
| 6,175,801 B1 | 1/2001 | Millington | |
| 6,219,614 B1 | 4/2001 | Uchigaki et al. | |
| 6,249,740 B1 | 6/2001 | Ito et al. | |
| 6,256,582 B1 | 7/2001 | Helmstadter et al. | |
| 6,263,343 B1 * | 7/2001 | Hirono | 707/104.1 |
| 6,292,203 B1 * | 9/2001 | Wang | 345/682 |
| 6,320,518 B2 | 11/2001 | Saeki et al. | |
| 6,324,467 B1 * | 11/2001 | Machii et al. | 701/200 |
| 6,334,087 B1 * | 12/2001 | Nakano et al. | 701/208 |

(Continued)

FOREIGN PATENT DOCUMENTS

JP    09-072753 A    3/1987

(Continued)

*Primary Examiner* — Tuan C. To
(74) *Attorney, Agent, or Firm* — Young & Thompson (57) ABSTRACT

A navigation terminal device includes a map information display unit 771, a destination display unit 773, a route line drawing unit 774 for holding retrieved location information or destination information or both of them and drawing a route from a reference point based on the retrieved information or destination information to the destination or the retrieved location information so as to be superimposed on the screen with the map information displayed thereon, and route searching unit 775 for exchanging the display between the reference point and the destination if the reference point disappears from the screen when the destination is displayed, thereby permitting to follow the route from the displayed reference point to the destination or from the destination to the reference point. In this configuration, the operability of a terminal device having a small capacity of screen can be improved and the burden for the user can be relaxed.

7 Claims, 4 Drawing Sheets

U.S. PATENT DOCUMENTS

| | | | |
|---|---|---|---|
| 6,452,570 B1 * | 9/2002 | Kuenzner | 345/7 |
| 6,496,204 B1 * | 12/2002 | Nakamura | 715/781 |
| 6,642,936 B1 * | 11/2003 | Engholm et al. | 345/661 |
| 6,643,416 B1 * | 11/2003 | Daniels et al. | 382/299 |
| 6,647,336 B1 | 11/2003 | Iwata | |
| 6,650,326 B1 * | 11/2003 | Huber et al. | 345/428 |
| 6,718,258 B1 * | 4/2004 | Barton | 701/200 |
| 6,755,745 B1 * | 6/2004 | Seto et al. | 463/43 |
| 6,856,326 B1 * | 2/2005 | Zhai | 345/684 |
| 6,983,331 B1 * | 1/2006 | Mitchell et al. | 709/246 |
| 7,320,105 B1 * | 1/2008 | Sinyak et al. | 715/277 |
| 2001/0011207 A1 | 8/2001 | Inoue et al. | |
| 2001/0019309 A1 | 9/2001 | Saeki et al. | |
| 2001/0027375 A1 | 10/2001 | Machida et al. | |
| 2001/0027376 A1 | 10/2001 | Tiede et al. | |
| 2001/0045949 A1 | 11/2001 | Chithambaram et al. | |
| 2001/0047242 A1 | 11/2001 | Ohta | |
| 2001/0053956 A1 | 12/2001 | Ohishi et al. | |
| 2002/0059296 A1 * | 5/2002 | Hayashi et al. | 707/104.1 |
| 2002/0135602 A1 * | 9/2002 | Davis et al. | 345/684 |

FOREIGN PATENT DOCUMENTS

| | | |
|---|---|---|
| JP | 11-218427 A | 8/1999 |
| JP | 11-296074 A | 10/1999 |

* cited by examiner

NAVIGATION TERMINAL DEVICE AND NAVIGATION METHOD

CROSS REFERENCE TO RELATED APPLICATIONS

This application is a divisional application of U.S. application Ser. No. 10/127,502 filed Apr. 23, 2002 now abandoned, which claims benefit of Japanese Application No. 2001-133362 filed Apr. 27, 2001, the entire disclosure of which is incorporated herein by reference.

BACKGROUND OF THE INVENTION

1. Field of the Invention

This invention relates to a navigation terminal device in which the map information containing location information retrieved by a server is received through the Web and displayed on a screen, and a method of navigation.

2. Description of the Related Art

At present, various kinds of items of information are provided on an internet via the WWW (World-Wide-Web) (hereinafter referred as Web) from the world. A user can retrieve desired information by operating a terminal device connected to the Web.

One of the various kinds of information services is a map information retrieval service. Through this service, the user can acquire desired map information displayed on a terminal by access to the Web server containing a map data base and connected to the internet Specifically, when the user inputs an address, a place name, a station name or various kinds of facility and store names, the map of the inputted item and its vicinity are displayed on the terminal device as image information. Therefore, with reference the map information thus displayed, the user can easily recognize where the designated station, facility, etc. is located.

Meanwhile, as the terminal device for the map information retrieval service using the above Web, not only a personal computer equipped with a Web connecting configuration such as a browser, but also an in-vehicle navigation system, a PDA (Personal Digital Assistants), portable telephone, etc. are used.

However, in the device having a relatively small capacity of screen such as a portable telephone, it is difficult to understand the information on the outskirts of the designated place map-displayed. This requires very troublesome excessive repetition of scrolling. The excessive repetition of scrolling affects not only the operability but waste the communication fee. Sometimes, an objection is raised from a user. This is burden also for the side of the terminal.

Unlike the in-vehicle navigation system, the portable telephone does not have the function of displaying a present location or setting a route. Therefore, although the present location or destination can be individually retrieved relatively easily, it is not easy to follow the route from the present location to the destination and its reverse. Namely, the portable telephone cannot set the user's own position. Therefore, the facility such as a station searched as a guide is set as a starting point. The destination is retrieved from the starting point by repetitive scrolling. In this case, however, the guide disappears from the screen. Therefore, even if the destination is found, it is difficult to follow the route from the guide to the destination. Therefore, the portable telephone is very poor in the operability. This is remarkable in an unknown place.

SUMMARY OF THE INVENTION

Under such a circumstance, this invention has been accomplished.

An object of this invention is to provide a navigation terminal device which can improve the operability by retrieving a destination from the map information displayed on a screen and displaying the route from a reference point of the location information retrieved by a server to the retrieved destination by superposition.

In accordance with a first aspect of this invention, there is provided a navigation terminal device by comprising:

map information displaying means for displaying the map information containing location information retrieved by a server and received via the Web;

destination displaying means for displaying a destination searched by screen scrolling from the map information displayed on the screen;

holding means for holding the retrieved location information or searched destination or both of them:

route drawing means for drawing a route from a reference point of the retrieved location information or searched destination to the searched destination or retrieved location information so as to be superimposed on the screen with the map information displayed thereon; and a route searching means for exchanging the display between the reference point and the destination if the reference point disappears from the screen when the destination is displayed, thereby permitting to follow the route from the displayed reference point to the destination or from the destination to the reference point.

In accordance with the configuration described above, a destination is searched from the map information displayed on a screen by screen scrolling, and the route from a reference point based on the location information retrieved by the Web server to the destination is superimposed on the map information on the screen. Where the reference point disappears from the screen when the destination is displayed, the display is exchanged from the destination from the reference point so that a user can follow the route from the displayed reference point to the destination according to the drawn route information.

The route line is drawn in such a manner that the orientation from the reference point to the destination is computed, and the computed result is created as a vector having a length and direction.

In this way, the regional information to the destination can be easily recognized by following the route. The terminal device having a small capacity of screen can do without redundant scrolling so that its operability is improved and the burden for the user is relaxed. The display is exchanged between the reference point and the destination by operating a specific button so that the operability of the terminal device can be further improved.

In accordance with the second aspect of this invention, there is provided a navigating method for a navigation system including a server for distributing map information and a navigation terminal device for displaying the map information containing location information retrieved by a server on a screen via the Web, comprising the steps of:

displaying a destination searched from the map information displayed on the screen by screen scrolling;

holding the retrieved location information or destination information or both of them;

drawing a route from a reference point based on the retrieved location information or the searched destination to the searched destination or the retrieved location information so as to be superimposed on the screen with the map information displayed thereon; and exchanging the display between the reference point and the destination if the reference point disappears from the screen when the destination is displayed, thereby following the route from the displayed reference point to the destination or the route from the destination to the reference point.

In accordance with the third aspect of this invention, there is provided a navigating terminal program for a navigation system including a server for distributing map information and a navigation terminal device for displaying the map information containing location information retrieved by a server on a screen via the Web, comprising the steps of:

displaying a destination searched from the map information displayed on the screen by screen scrolling;

holding the retrieved location information or destination information or both of them;

drawing a route from a reference point based on the retrieved location information or the searched destination to the searched destination or the retrieved location information so as to be superimposed on the screen with the map information displayed thereon; and exchanging the display between the reference point and the destination if the reference point disappears from the screen when the destination is displayed, thereby following the route from the displayed reference point to the destination or the route from the destination to the reference point.

In accordance with the fourth aspect of this invention, there is provided a recording medium which is readable by a computer and stores a navigating terminal program for a navigation system including a server for distributing map information and a navigation terminal device for displaying the map information containing location information retrieved by a server on a screen via the Web, the program causing the computer to execute the steps of:

displaying a destination searched from the map information displayed on the screen by screen scrolling;

holding the retrieved location information or destination information or both of them;

drawing a route from a reference point based on the retrieved location information or the searched destination to the searched destination or the retrieved location information so as to be superimposed on the screen with the map information displayed thereon; and exchanging the display between the reference point and the destination if the reference point disappears from the screen when the destination is displayed, thereby following the route from the displayed reference point to the destination or the route from the destination to the reference point.

The above and other objects and features of the invention will be more apparent from the following description taken in conjunction with the accompanying drawings.

DETAILED DESCRIPTION OF THE INVENTION

Now referring to the drawings, a detailed explanation will be given of a preferred embodiment of this invention.

Figure 1:
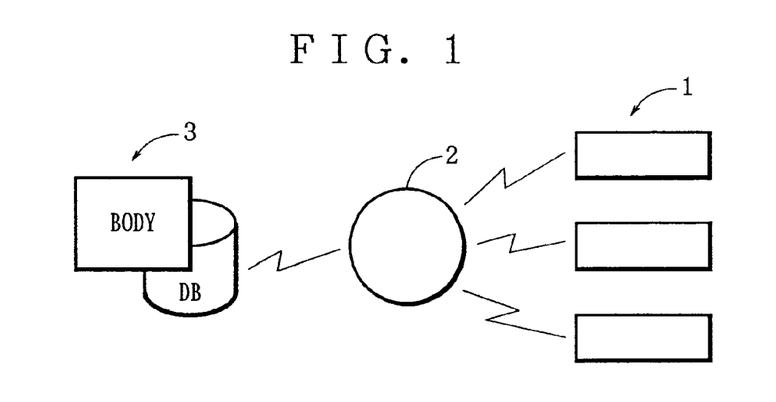
FIG. 1 is a view showing an example of a connecting format to which this invention is applied.

FIG. 1 is a view showing the connecting format of a navigation system to which this invention is applied. In FIG. 1, reference numeral 1 denotes individual navigation terminal devices each having a browser function as a client; 2 an internet; and 3 a Web server.

Now, a portable telephone having a Web connecting configuration is illustrated as the navigation terminal device 1. The portable telephone having a relatively small capacity of screen is connected to the internet 2 though a public switched network or an access service. The internet 2 is connected to a Web server 3 which serves as a map information providing site, a map information data base site and a route setting site.

The map information providing site is a site for carrying out the service of providing the map information by the Web. The map information providing site unifies the information supply to the map data base site and the route setting site described later.

The map information providing site includes, as a Web server 3, a data base (DB) in which the land marks such as addresses and facilities and their location information are stored. The Web server 3 accesses the data base on the basis of the input information from the navigation terminal device 1 so that the address or facility is specified from the input location information and the corresponding location information is acquired from the specified land mark.

The map data base site is a site for carrying out the retrieval/display service of the map information on the internet so that the map data read out is supplied to the navigation terminal device 1. The map data base site includes a map server for supplying map data read out to the navigation terminal device 1 and a map information data base in which location information indicative of the coordinates by latitudes and longitudes, display information of the map such as a reduced scale, map size, etc. and the image data of the map corresponding to these items of information are stored.

Figure 2:
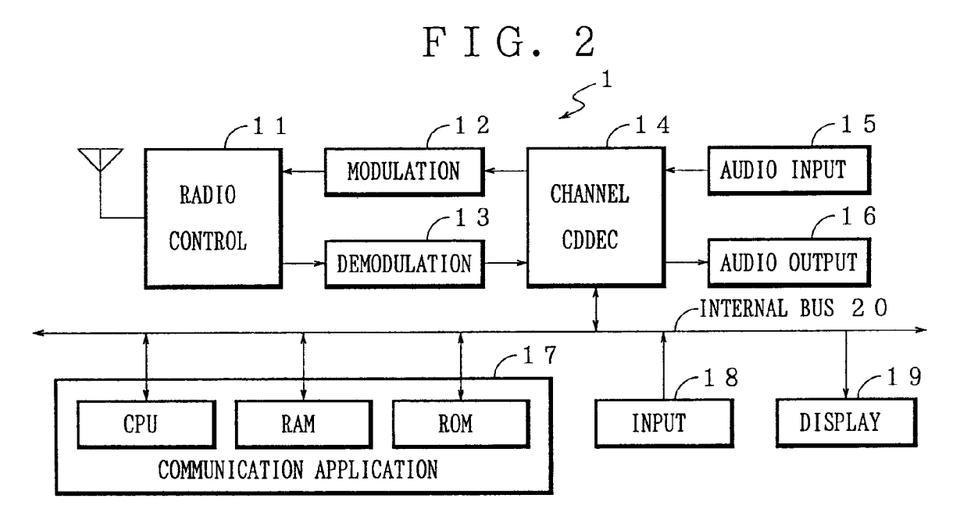
FIG. 2 is a block diagram showing an internal configuration of a navigation terminal device 1 in FIG. 1.

FIG. 2 is a block diagram showing the internal configuration of the navigation terminal device 1 in FIG. 1. As described above, as the navigation terminal device 1, the portable telephone provided with the Web connecting configuration is illustrated.

The navigation terminal device 1 includes a radio control unit 11, a modulating unit 12, a demodulating unit 13, a channel codec 14, an audio input unit 15, an audio output unit 16, a communication application unit 17, an input unit 18 and a display unit 19. The radio control unit 11, channel codec 14, communication application unit 17, input unit 18 and display unit 19 are commonly connected to an internal bus 20.

The radio control unit 11 serves to transmit modulated data supplied by the modulating unit 12 from an antenna together with a radio carrier wave and receive the signal at a prescribed frequency from the high frequency signals induced at the antenna. The modulating unit 12 serves to modulate the transmission data outputted from the channel codec 14 in a prescribed system (e.g. π/4 shift DPQSK) and supply the modulated data to the radio control unit 11. The demodulating unit 13 serves to demodulate the signal received by the radio control unit 11 and supply the signal thus demodulated to the channel codec 14.

The channel codec 14 divisionally supplies the data received from the demodulating unit 13 to the audio output unit 16 or the communication application 17. The channel codec 14 also divisionally supplies the audio received from the audio input unit 15 to the modulating unit 12 or the communication application unit 17. The channel codec 14 also divisionally supplies the data received from the communication application unit 17 to the modulating unit 12 or the audio output unit 16.

The communication application unit 17 includes a CPU, ROM and RAM and serves as a control center for the navigation terminal device 1 which performs not only the connecting control for communication but also control for the creation of the transmission data, display/reserve of the received data and processing of the received/transmitted data. The details thereof will be explained later.

The input unit 18 recognizes the connected key or button to input a dialing number and display image operating data. The display unit 19 displays, on a connected screen display monitor, the data produced from the communication application unit 17 and stored in the display memory not shown.

Figure 3:
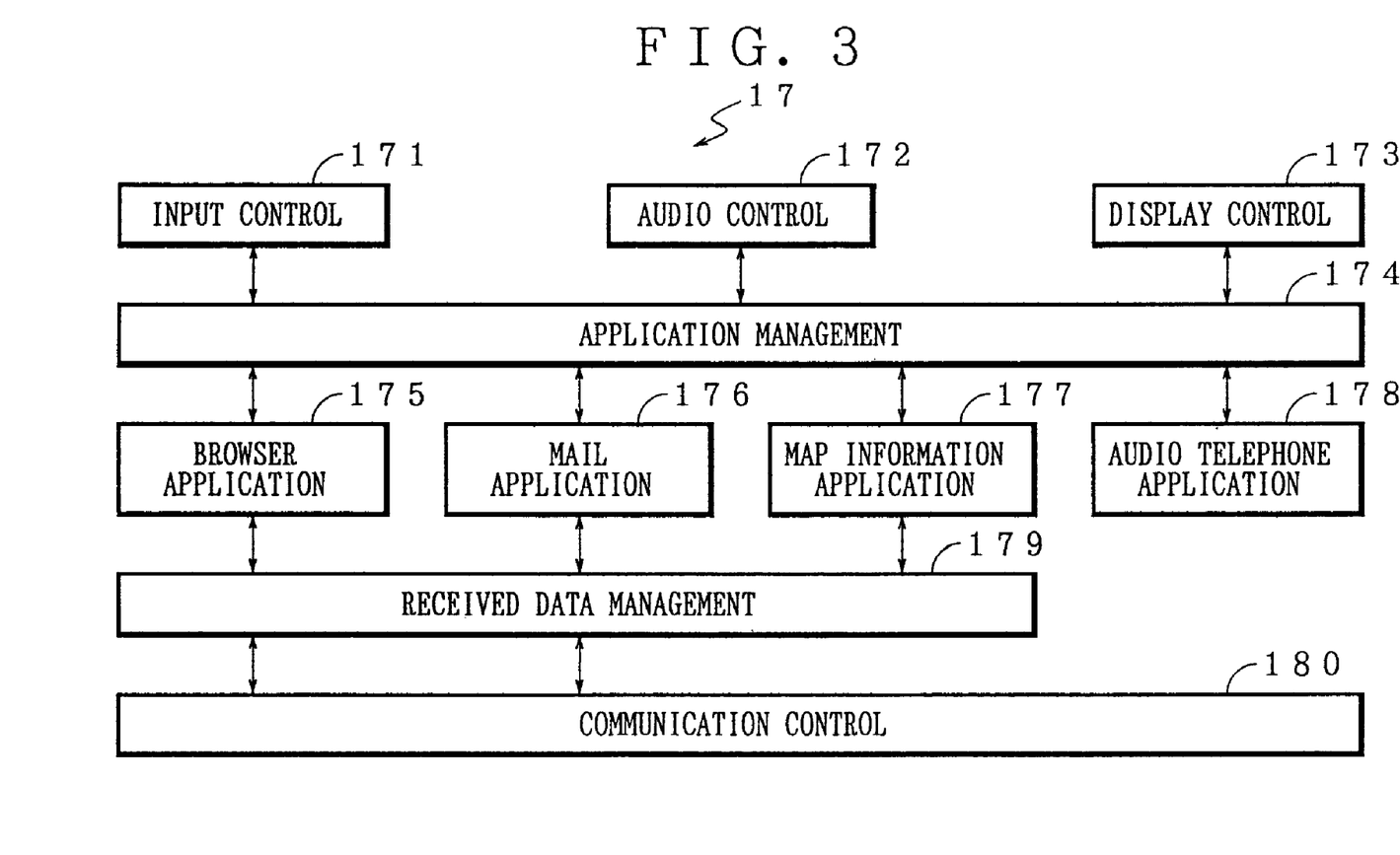
FIG. 3 is a block diagram showing the internal configuration expanded in function of a communication application unit 37 shown in FIG. 2.

FIG. 3 is a developed block diagram of the internal configuration of the communication application unit 17 as shown in FIG. 2. Concretely, the communication application unit 17 is constructed of a peripheral LSI such as an input unit 18, display unit 19, etc. inclusive of the CPU, ROM/RAM. The function of each block described later is realized in such a manner that CPU reads the program stored in the ROM and executes it using the RAM.

The communication application unit 17 includes an input control unit 171, an audio control unit 172, a display control unit 173, an application management unit 174, a browser application 175, a mail application 176, a map information application 177, an audio telephone application 178, a received data management unit 179 and a communication control unit 180.

The input control unit 171 informs the application management unit 174 of the input key information and others received from the input unit 18. The display control unit 173 performs the control of supplying the display information received from the application management unit 174 to the display unit 19. The audio control unit 173 performs the control of informing the application management unit 174 of the audio received from the audio input unit 15 or supplying the audio received from the application management unit 174 to the channel codec 14.

The application management unit 174 performs the management of selecting one of a plurality of applications prepackaged in the navigation terminal device 1 according to this invention, or exchanging the information between each application and the input control unit 171, display control unit 172, audio control unit 173. It is now assumed that four applications of the browser application 175, mail application 176, map information application 177 and audio telephone application 178 have been prepackaged. However, it is needless to say that any other application can be also prepackaged.

The applications to be prepackaged are classified into applications designed for the audio service and for the character service. The former does not carry out the transmission/reception of character data and image data, but supports the audio. The audio telephone application 178 is an example thereof The latter does not carry out the transmission/reception of the character data and image data such as a map and supports the screen display of each item of information to be transmitted or received. The browser application 175, mail application 176 and the map information application 177 are examples thereof.

Figure 4:
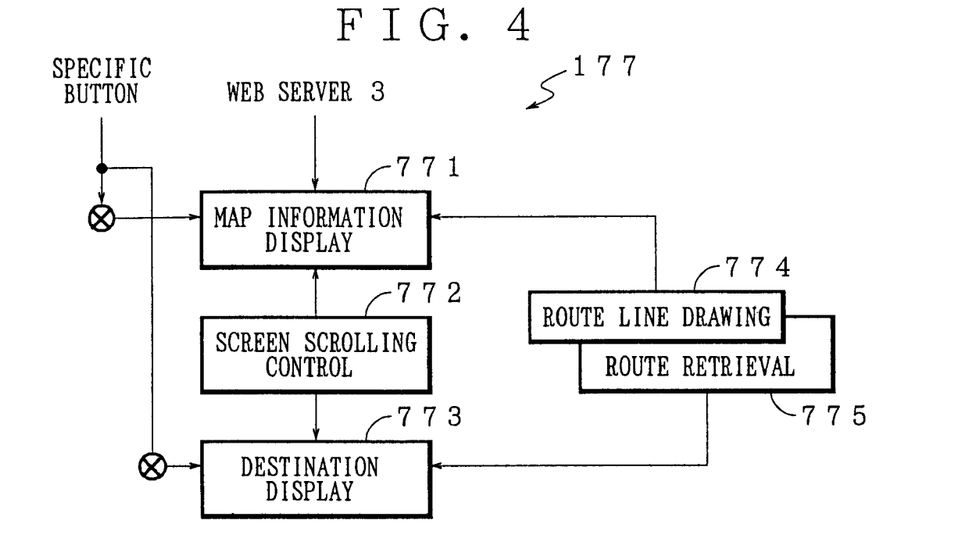
FIG. 4 is a block diagram showing the internal configuration expanded in function of a map information application shown in FIG. 3.

The internal configuration expanded in function of the map information application 177 is shown in FIG. 4. The map information application 177 includes a map information display unit 771, a scrolling control unit 772, a destination display unit 773, a route line drawing unit 774 and a route searching unit 775.

The map information display unit 771 has a function of displaying, on a screen of the display unit 19, the map information containing the location information retrieved by the Web server 3 which is received via the internet 2. The destination display unit 773 has a function of displaying the destination searched from the map information displayed on the screen of the display unit 19 by the scroll controlling by the scrolling control unit 772.

The route line drawing unit 774 has a function of drawing the route connecting a reference point based on the location information retrieved by the Web server 3 to the destination so as to be superimposed on the screen with the map information displayed thereon. The route is represented by the straight line extended from the center of the map information displayed on the screen to the reference point. The route searching unit 775 has a function of re-drawing the route from the reference point to the destination on the basis the updated screen when distribution of the map information is requested.

The route searching unit 775 has a function of exchanging the display between the reference point and the destination when the destination is displayed by the destination display unit 773 but the reference point disappears from the screen, thereby following the route from the reference point to the destination according to the drawn route information.

Again referring to FIG. 3, the communication control unit 180 performs the dialing/calling connection and data communication control according to the command from each of the applications 175, 176, 177 and 178. The received data managing unit 179 is located between the communication control unit 180 and each of the browser application 175, mail application 176 and map information application 177 to manage the received data to be transferred from the former to the latter.

Figure 5:
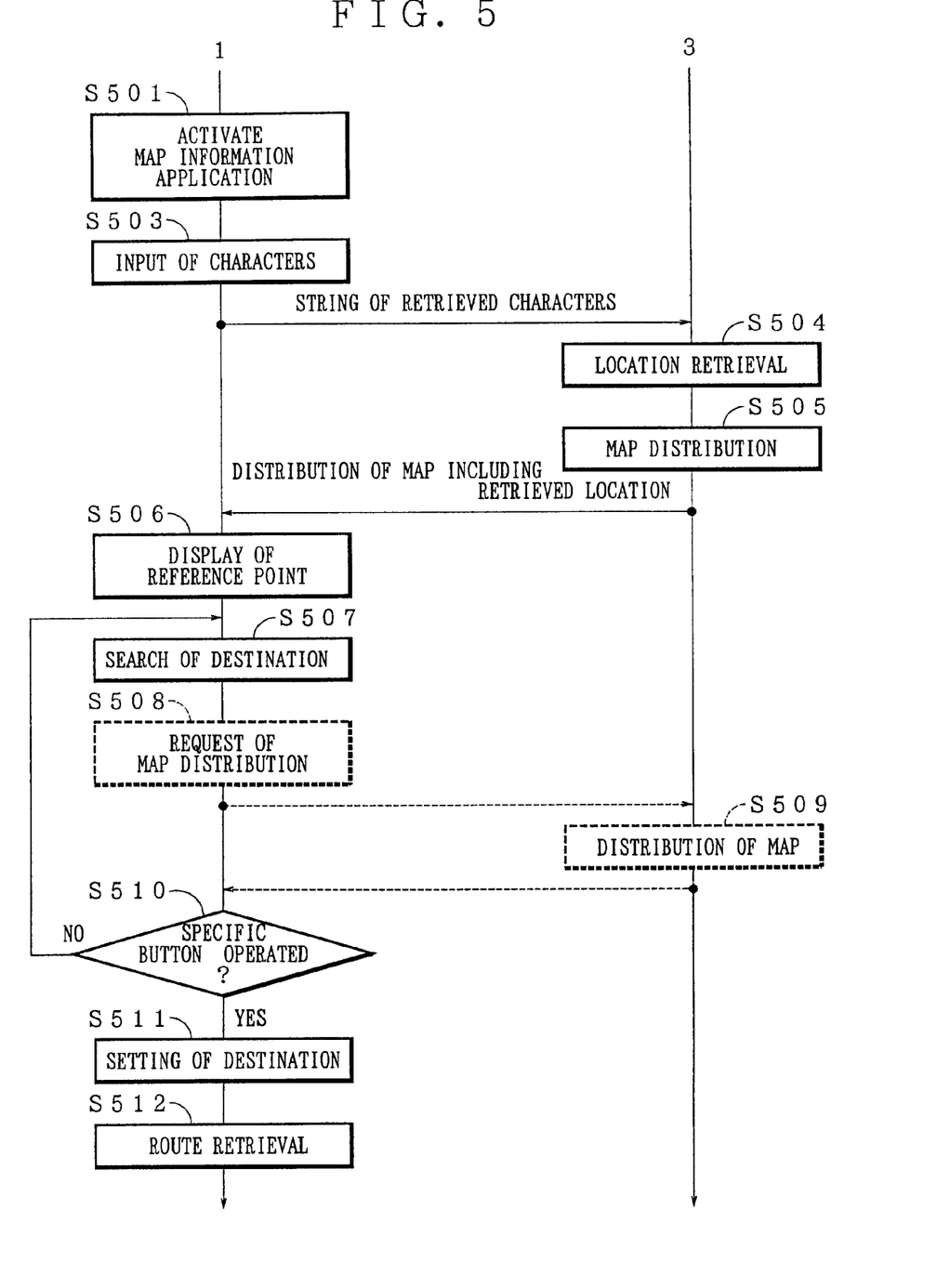
FIG. 5 is an operation sequence for explaining the operation of an embodiment of this invention.

FIG. 5 is an operation sequence chart for explaining the operation of the navigation system according to this invention in the relationship between the navigation terminal device 1 and the Web server 3. FIG. 6 shows an example of screen display.

Now referring to FIGS. 5 and 6, an explanation will be given of the operation of the navigation system according to the embodiment of this invention.

First, a user accesses the map information site by operating the navigation terminal device 1 to download the map information application (step S501). The user designates a prescribed facility, such as a station, department store, convenience store, public facility, etc., which is used as a reference point, or otherwise requests the Web server 3 to distribute the map information in a prescribed region by specifying the address, place name or postal number, etc. by character inputting (step S503).

The Web server 3 receives the inputted character to retrieve the facility and map data base, and distributes the map information in a reduced scale containing the facility centered thereon to the navigation terminal device 1 (steps S504, S505).

Figure 6A:
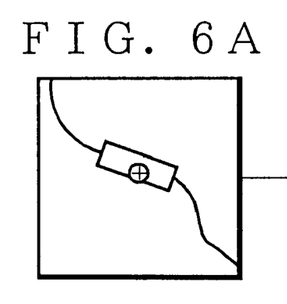
FIGS. 6A to 6D are views each showing a screen configuration of a navigation terminal device for explaining the embodiment of this invention.
Figure 6B:
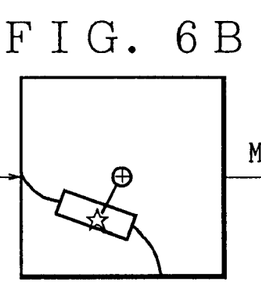

The navigation terminal device 1 displays the map information containing the outskirt of the centered facility used as the reference point. FIG. 6A shows an example of the screen display. Now, the station used as the reference point is centered on the screen (step S506).

Next, the user will move toward his destination while carrying the navigation terminal device 1. However, before he moves, he operates the navigation terminal device 1 to search the destination. The searching of the destination is performed by scrolling the screen using the screen scrolling unit 772 (step S507).

Figure 6C:
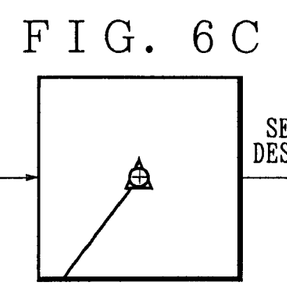

Now it is assumed that when the destination is displayed by the destination display unit, the station which is the previous reference point has disappeared from the screen. FIG. 6C shows the screen display in this case.

However, the route line represented by the straight line connecting the reference point to the destination is left on the screen of the navigation terminal device 1. This is carried out by the route line drawing unit 774 . FIG. 6C shows the screen display in this case. The route line drawing unit 774 draws the route connecting a reference point of the location information retrieved by the Web server 3 to the destination so as to be superimposed on the screen with the map information displayed thereon.

The route line is drawn in such a manner that the orientation from the reference point to the destination is computed by an operation routine incorporated in the route line drawing unit 774, and the computed result is created as a vector having a length and direction. The vector is displayed as a straight line on the screen so that the user can follow the route from the reference point to the destination.

Figure 6D:
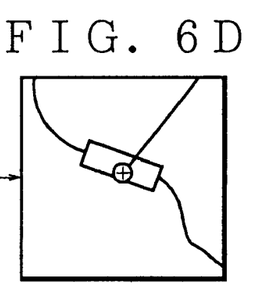

The navigation terminal device according to this invention has a function of holding the reference point and can exchange the display between the reference point and destination by detecting the fact that a specific button has been operated (steps S510, 511). FIG. 6D shows an example of the display screen in this case.

The user can follow the route from the displayed reference point to the destination and its reverse according to the route line information drawn on the screen of the navigation terminal device 1 (step S508). The route line is searched by the route searching unit 776.

During the process from step S506 (display of the reference point) to step 507 (setting of the destination), the navigation terminal device 1 requests the Web server 3 to distribute the map information of a prescribed region as the occasion demands and receives the distributed map information (both indicated by dotted lines). This is carried out by the map information display unit 771. Where the destination is not included in the map of the outskirt previously received, the navigation terminal device 1 requests the Web server 3 to distribute the map information of the neighboring outskirt again.

The destination is searched on the basis of the distributed updated map information by screen scrolling. The route line drawing unit 774 draws the route from the reference point to the destination on the screen again by computing the orientation from the reference point to the destination. Even when the map information is updated, the route searching unit 775 can follow the route line from the reference point to the destination which has been drawn on the screen by the route line drawing unit 774.

The navigation terminal device 1 receives, from the Web server 3, the information of the reference point and destination within a prescribed distance from the displayed center point. The direction from the center point to the reference point or destination and the distance therebetween are computed, and they are created and drawn as segment information. It is now assumed that the length of the segment representative of the orientation is set according to the distance.

In the above embodiment of this invention, the map information was distributed from the Web server 3. However, it may be prepared on the side of the navigation terminal device 1. Although the navigation terminal device 1 accesses the Web server 3 to acquire the location information when the destination is set, it may inherently have the location information.

Further, the navigation terminal device 1 should not be limited to the portable telephone adopted in the embodiment. The PDA, home personal computer, in-vehicle navigation device may be used as the navigation terminal device 1. The navigation system according to this invention may be applied to not only the communication network via the internet, but a closed system using the recording medium such as CD-ROM, DVD, etc.

Incidentally, the procedure shown as a sequence chart in FIG. 5 is previously programmed or recorded in the navigation terminal device 1 and the Web server 3, and the read program is executed by CPU. However, the program is recorded in the recording medium such as a semiconductor memory, optical disk, hard disk, floppy disk, etc. Further, the program is not fixed on these recording media, but may be downloaded via a communication line.

Incidentally, the contents of Japanese Patent Appln. No. 2001-13362 filed on Apr. 27, 2001 are hereby incorporated by reference.

What is claimed is:

1. A navigating apparatus, comprising:
   a map information displaying unit setting a reference point, searched in accordance with a user's operation, which reference point is displayed as a mark for the reference point, map information displaying unit acquiring map information of a peripheral area containing the reference point, and displaying the acquired map information on a screen;
   a screen scroll controlling unit scrolling the map information displayed on the screen in accordance with a user's operation to search for a destination;
   a destination setting unit setting a prescribed point, on a screen, indicated by the scrolled map information, as the destination set by the user; and
   a drawing unit drawing a straight line connecting the reference point to the prescribed point on the screen during the time of the user scrolling the map information from the reference point to the destination so that the straight line is superimposed on the screen on which the map information is displayed during the time from displaying of the map information of the peripheral area containing the reference point to time of the user setting of the destination.

2. The navigation apparatus according to claim 1, further comprising:
   a display changing unit, when the prescribed point is set as a destination by the destination setting unit, and in the case where the reference point disappears from the screen during the scrolling, changes a display of the scrolled map information in which the reference point disappears, to a display of map information containing i) the prescribed point indicating the destination, ii) the peripheral area containing the prescribed point, and iii) a portion of the straight line leading back towards the reference point.

3. The navigation apparatus according to claim 1, wherein the reference point is displayed in a center position of the screen during the scrolling, and the prescribed point is displayed at the center position on the screen when the reference point disappears from the screen.

4. The navigation apparatus according to claim 1, wherein the map information displaying unit, in the case where the destination is not in the obtained map information, during the scrolling obtains further map information of a further peripheral area in a direction of the scrolling, and displays the obtained further map information on the screen, with the straight line leading back towards the reference point.

5. The navigation apparatus according to claim 1,
wherein the map information displaying unit is a unit obtaining map information containing the reference point from a web server through an internet.

6. A navigating method, comprising the steps of:
setting a point, searched in accordance with a user's operation, which point is a mark of a reference point, acquiring map information of a peripheral area containing the reference point, and displaying the acquired map information on a screen;
scrolling the map information displayed on the screen in accordance with a user's operation and, during said scrolling, displaying a straight line from the reference point in the direction of the scrolling;
setting a prescribed point, on a screen, indicated by the scrolled map information, as a destination;
drawing a straight line connecting the reference point to the prescribed point on the screen so as to be superimposed on the screen on which the map information is displayed, the straight line being superimposed on the screen during the time from i) the displaying of the map information of the peripheral area containing the reference point, ii) the scrolling, to iii) the setting of the destination.

7. A non-transitory recording medium which is readable by a computer and stores a navigating program for a navigation apparatus, the navigating program causing the computer to execute the steps of:
setting a point, searched in accordance with a user's operation, which point is a mark of a reference point, acquiring map information of a peripheral area containing the reference point, and displaying the acquired map information on a screen;
scrolling the map information displayed on the screen in accordance with a user's operation and, during said scrolling, displaying a straight line from the reference point in the direction of the scrolling;
setting a prescribed point, on a screen, indicated by the scrolled map information, as a destination; and
drawing a straight line connecting the reference point to the prescribed point on the screen so as to be superimposed on the screen on which the map information is displayed, the straight line being superimposed on the screen during i) the time from the displaying of the map information of the peripheral area containing the reference point, ii) the scrolling, to iii) the setting of the destination.

* * * * *